(12) United States Patent  
Shao

(10) Patent No.: US 11,734,113 B2  
(45) Date of Patent: Aug. 22, 2023

(54) SOLID STATE DISK ACCESS METHOD AND APPARATUS, DEVICE, AND MEDIUM

(71) Applicant: INSPUR SUZHOU INTELLIGENT TECHNOLOGY CO., LTD., Jiangsu (CN)

(72) Inventor: Wenhao Shao, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/009,820

(22) PCT Filed: Feb. 20, 2021

(86) PCT No.: PCT/CN2021/076979  
§ 371 (c)(1),  
(2) Date: Dec. 12, 2022

(87) PCT Pub. No.: WO2022/021857  
PCT Pub. Date: Feb. 3, 2022

(65) Prior Publication Data  
US 2023/0195569 A1 Jun. 22, 2023

(30) Foreign Application Priority Data  
Jul. 28, 2020 (CN) .......................... 202010738637.6

(51) Int. Cl.  
*G06F 11/10* (2006.01)  
*G06F 11/07* (2006.01)  
(Continued)

(52) U.S. Cl.  
CPC ...... *G06F 11/1068* (2013.01); *G06F 11/0793* (2013.01); *G06F 11/1016* (2013.01)

(58) Field of Classification Search  
CPC ............. G06F 11/1016; G06F 11/0793; G06F 11/1068  
See application file for complete search history.

(56) References Cited

U.S. PATENT DOCUMENTS 5,479,633 A * 12/1995 Wells .................... G06F 3/0601  
711/159  
11,336,665 B2 * 5/2022 Thayer ................ H04L 63/1416  
(Continued)

FOREIGN PATENT DOCUMENTS

| CN | 102163165 A | 8/2011 |
|---|---|---|
| CN | 106981314 A | 7/2017 |

(Continued)

OTHER PUBLICATIONS

Corresponding International Patent Application No. PCT/CN2021/076979, International Search Report, dated May 21, 2021. English Translation.

(Continued)

*Primary Examiner* — Guy J Lamarre  
(74) *Attorney, Agent, or Firm* — Cooper Legal Group, LLC

(57) ABSTRACT

A solid state disk access method includes: determining, in response to a read error, a first read voltage of the current data block according to a current data storage time interval to which a data storage time of the current data block belongs; performing reread error correction on the data in the current data block based on the first read voltage; determining, if reread error correction of the current data block fails, a second read voltage corresponding to the current data block according to the current data storage time interval and a preset data read rule that is determined based on the data storage time interval and the number of data reads; and performing reread error correction on the data in the current data block based on the second read voltage until (Continued)

the reread error correction of the current data block meets a preset reread error correction condition.

20 Claims, 3 Drawing Sheets

(51) Int. Cl.
    *G06F 13/28*     (2006.01)
    *G06F 13/16*     (2006.01)
    *G06F 11/30*     (2006.01)

(56) References Cited

U.S. PATENT DOCUMENTS

| | | | | |
|---|---|---|---|---|
| 2015/0067443 A1* | 3/2015 | Bao | ............... | G06F 3/0647 |
| | | | | 714/764 |
| 2016/0077913 A1* | 3/2016 | Yao | ............... | G11C 29/021 |
| | | | | 714/764 |
| 2016/0225460 A1* | 8/2016 | Chou | ............... | G11C 29/021 |
| 2019/0042356 A1* | 2/2019 | Chen | ............... | G11C 16/26 |
| 2020/0183783 A1* | 6/2020 | Xie | ............... | G11C 16/10 |
| 2022/0413963 A1* | 12/2022 | Lee | ............... | G11C 29/50012 |

FOREIGN PATENT DOCUMENTS

| | | |
|---|---|---|
| CN | 107291382 A | 10/2017 |
| CN | 108647111 A | 10/2018 |
| CN | 110007861 A | 7/2019 |
| CN | 110058957 A | 7/2019 |
| CN | 110689914 A | 1/2020 |
| CN | 111880736 A | 11/2020 |

OTHER PUBLICATIONS

Corresponding International Patent Application No. PCT/CN2021/076979, Written Opinion, dated May 21, 2021. English Translation.
Corresponding Chinese Patent Application No. 202010738637.6, Notification to Grant dated Jul. 27, 2022.

* cited by examiner

SOLID STATE DISK ACCESS METHOD AND APPARATUS, DEVICE, AND MEDIUM

CROSS-REFERENCE TO RELATED APPLICATION

This application claims priority to Chinese Patent Application No. CN202010738637.6, filed on Jul. 28, 2020 in China National Intellectual Property Administration and entitled "Solid State Disk Access Method and Apparatus, Device, and Medium", which is hereby incorporated by reference in its entirety.

FIELD

The present application relates to the technical field of data storage, and in particular to a solid state disk access method and apparatus, a device, and a medium.

BACKGROUND

In the era of large data, the storage of mass data is increasingly important. While the speed of CPU and other computing components is increasing, the storage and read rate of data has been the system bottleneck. At present, as the price of NAND flash memories gradually decreases, the number of solid state disks (SSD) is increasing year by year. Unlike traditional hard disks, storage units of the solid state disks are the NAND flash memories. For the ability of the NAND flash memories to store data, it is more probable that data read errors are increased with the number of PEs, the number of data reads and passage of a data storage time, thus making error processing become an important part of SSD. The current error processing is to perform error correction using a retry table given by NAND manufacturers so as to obtain correct user data. Error correction is performed by sequentially trying to read data from hard disks according to read voltage values in the retry table given by the NAND manufacturers. In this method, each read voltage needs to be sequentially tried according to the order in the retry table until data is successfully read. However, a large number of read voltages included in the retry table increase the time consumed by the whole error recovery flow (ERF) and reduce the data read efficiency of the hard disks.

SUMMARY

In view of this, the present application aims to provide a solid state disk access method and apparatus, a device, and a medium, which can perform reread error correction on data having a read error in a solid state disk, save the time of an ERF and improve the efficiency of the ERF, thus improving the data read performance of the solid state disk. The solution is as follows.

In a first aspect, the present application discloses a solid state disk access method, including:

determining, in response to a read error for data in a current data block, a first read voltage of the current data block according to a current data storage time interval to which a data storage time of the current data block belongs;

performing reread error correction on the data in the current data block based on the first read voltage;

determining, in response to reread error correction of the current data block failing, a second read voltage corresponding to the current data block according to the current data storage time interval and a preset data read rule that is determined based on the data storage time interval and a number of data reads; and performing reread error correction on the data in the current data block based on the second read voltage until the reread error correction of the current data block meets a preset reread error correction condition.

In some embodiments, the step of performing reread error correction on the data in the current data block based on the first read voltage includes:

performing, in response to the first read voltage including a plurality of read voltage values, reread error correction on the data in the current data block based on each read voltage value in the first read voltage respectively.

In some embodiments, before the step of determining, in response to the read error for data in the current data block, the first read voltage of the current data block according to the current data storage time interval to which the data storage time of the current data block belongs, the method further includes:

acquiring preset data storage time interval information and a read voltage corresponding to each data storage time interval; and acquiring a read voltage corresponding to the number of data reads, and storing each of the data storage time intervals, the read voltage corresponding to each of the data storage time intervals and the read voltage corresponding to the number of data reads.

In some embodiments, the step of acquiring the preset data storage time interval information and the read voltage corresponding to each data storage time interval includes:

acquiring the preset data storage time interval information; and determining a read voltage corresponding to each of the data storage time interval in the preset data storage time interval information based on a read voltage in a retry table of a solid state disk where the current data block is located.

In some embodiments, the step of determining the read voltage corresponding to any data storage time interval in the preset data storage time interval information based on the read voltage in the retry table of the solid state disk where the current data block is located includes:

reading data having a storage time belonging to the data storage time interval based on each of the read voltage in the retry table respectively, so as to obtain a read accuracy rate corresponding to each of the read voltage in the retry table; and determining a read voltage corresponding to the data storage time interval according to the read accuracy rate.

In some embodiments, before the step of determining, in response to the read error for data in the current data block, the first read voltage of the current data block according to the current data storage time interval to which the data storage time of the current data block belongs, the method further includes:

acquiring the preset data read rule, and storing the preset data read rule.

In some embodiments, after the step of performing reread error correction on the data in the current data block based on the first read voltage, the method further includes:

judging whether the read accuracy rate of the current data block is greater than or equal to a preset accuracy rate threshold value;

determining that the reread error correction of the current data block is successful in response to the read accuracy rate of the current data block being greater than or equal to the preset accuracy rate threshold value; and determining that the reread error correction of the current data block fails in response to the read accuracy rate of the current data block being smaller than the preset accuracy rate threshold value.

In a second aspect, the present application discloses a solid state disk access apparatus, including:

a first voltage determination module, configured to determine, in the case of a read error for data in a current data block, a first read voltage of the current data block according to a current data storage time interval to which a data storage time of the current data block belongs;

a first data read module, configured to perform reread error correction on the data in the current data block on the basis of the first read voltage;

a second voltage determination module, configured to determine, when reread error correction of the current data block fails, a second read voltage corresponding to the current data block according to the current data storage time interval and a preset data read rule that is determined on the basis of the data storage time interval and the number of data reads; and a second data read module, configured to perform reread error correction on the data in the current data block on the basis of the second read voltage until the reread error correction of the current data block meets a preset reread error correction condition.

In a third aspect, the present application discloses an electronic device, including:

a memory and a processor.

The memory is configured to store a computer instruction.

The processor is configured to execute the computer instruction so as to implement the solid state disk access method disclosed above.

In a fourth aspect, the present application discloses a computer-readable storage medium for storing a computer instruction. The computer instruction, when executed by a processor, implements the solid state disk access method disclosed above.

It can be seen that in the present application, in the case of a read error for data in a current data block, a first read voltage of the current data block is first determined according to a current data storage time interval to which a data storage time of the current data block belongs; then, reread error correction is performed on the data in the current data block based on the first read voltage; if reread error correction of the current data block fails, a second read voltage corresponding to the current data block is determined according to the current data storage time interval and a preset data read rule that is determined based on the data storage time interval and the number of data reads; and reread error correction is performed on the data in the current data block based on f the second read voltage until the reread error correction of the current data block meets a preset reread error correction condition. In this way, in the case of a read error for data in a current data block, a first read voltage of the current data block is first determined according to a current data storage time interval to which a data storage time of the current data block belongs, and reread error correction is performed on the data in the current data block based on the first read voltage. If the reread error correction fails, a second read voltage corresponding to the current data block is determined according to the current data storage time interval and a preset data read rule, and reread error correction is performed on the data in the current data block based on the second read voltage until the reread error correction of the current data block meets a preset reread error correction condition. In this way, reread error correction is first performed on data from a data storage time dimension, and then in the case where the reread error correction fails, reread error correction is performed on the data in the current data block according to the current data storage time interval to which the current data block belongs and the preset data read rule, whereby reread error correction can be performed on data having a read error in a solid state disk, the time of an ERF can be saved, and the efficiency of the ERF can be improved, thus improving the data read performance of the solid state disk.

BRIEF DESCRIPTION OF THE DRAWINGS

In order to describe the embodiments of the present application or the technical solutions in the prior art more clearly, drawings required to be used in the embodiments or the illustration of the prior art will be briefly introduced below. Apparently, the drawings in the illustration below are only some embodiments of the present application. Those ordinarily skilled in the art also can obtain other drawings according to the provided drawings without creative work.

DETAILED DESCRIPTION

The technical solutions in the embodiments of the present application will be clearly and completely described below with reference to the accompanying drawings in the embodiments of the present application. Obviously, the described embodiments are only a part of the embodiments of the present application, rather than all the embodiments. Based on the embodiments of the present application, all other embodiments obtained by those skilled in the art without creative work shall fall within the protection scope of the present application.

The current data read error processing for solid state disks is to perform error correction using a retry table given by NAND manufacturers so as to obtain correct user data. Error correction is performed by sequentially trying to read data from hard disks according to read voltage values in the retry table given by the NAND manufacturers. In this method, each read voltage needs to be sequentially tried according to the order in the retry table until data is successfully read. However, a large number of read voltages included in the retry table increase the time consumed by the whole ERF and reduce the data read efficiency of the hard disks. In view of this, the present application provides a solid state disk access method, which can perform reread error correction on data having a read error in a solid state disk, save the time of an ERF and improve the efficiency of the ERF, thus improving the data read performance of the solid state disk.

Figure 1:
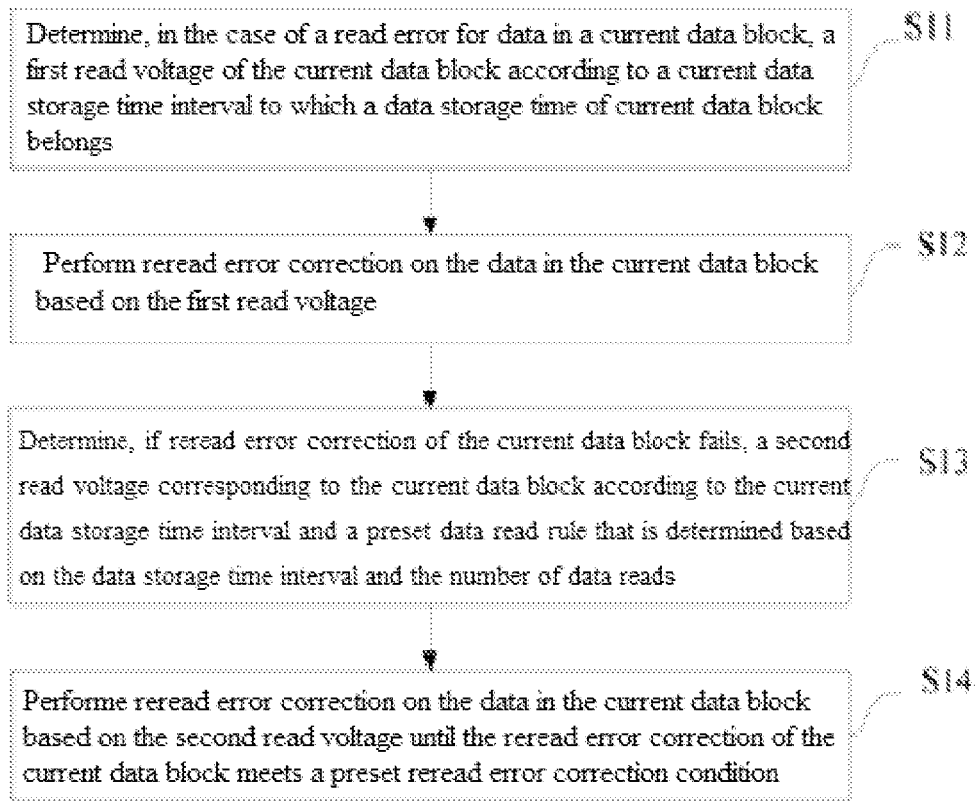
FIG. 1 is a flowchart of a solid state disk access method disclosed by the present application.

Referring to FIG. 1, an embodiment of the present application discloses a solid state disk access method, including the following steps:

Step S11: determining, in the case of a read error for data in a current data block, a first read voltage of the current data block according to a current data storage time interval to which a data storage time of the current data block belongs.

In a certain implementation process, when data is read from a solid state disk, a data read error may occur. Therefore, in the case of a read error for data in a current data block, a first read voltage of the current data block is determined according to a current data storage time interval to which a data storage time of the current data block belongs, so as to perform reread error correction on the current data block based on the first read voltage. That is, a current data storage time interval is determined according to the data storage time of the current data block and pre-stored preset data storage time interval information, and then a first read voltage value corresponding to the current data storage time interval is determined according to a read voltage corresponding to each pre-stored data storage time interval. The division of each data storage time interval in the preset data storage time interval information may be determined according to actual situations. For example, a data storage time interval is a storage time of 2-3 months.

A plurality of read voltage values may be included in the first read voltage. The number may be determined according to actual situations, and is not defined herein. It may be judged whether there is a read error for the data in the current data block by judging whether the read accuracy rate of the data in the current data block is greater than or equal to a corresponding accuracy rate threshold value.

Step S12: performing reread error correction on the data in the current data block based on the first read voltage.

It will be appreciated that after the first read voltage is determined, reread error correction may be performed on the data in the current data block based on the first read voltage. If the first read voltage includes a plurality of read voltage values, reread error correction is performed on the data in the current data block based on each read voltage value in the first read voltage respectively.

After reread error correction is performed on the data in the current data block based on the first read voltage, it is also necessary to judge whether the read accuracy rate of the current data block is greater than or equal to a preset accuracy rate threshold value. It is determined that the reread error correction of the current data block is successful if the read accuracy rate of the current data block is greater than or equal to the preset accuracy rate threshold value. It is determined that the reread error correction of the current data block fails if the read accuracy rate of the current data block is smaller than the preset accuracy rate threshold value.

If the first read voltage includes a plurality of read voltage values, it is judged whether the read accuracy rate of the current data block under the current read voltage is greater than or equal to the preset accuracy rate threshold value after a reread error correction is performed on the data on the basis of each read voltage, so as to determine whether the reread error correction of the current data block under the current read voltage is successful. And it is determined that the reread error correction of the current data block fails when the read accuracy rate of the current data block under each read voltage value in the first read voltage is smaller than the preset accuracy rate threshold value. The number of the plurality of read voltage values is greater than or equal to 2.

Step S13: determining, if reread error correction of the current data block fails, a second read voltage corresponding to the current data block according to the current data storage time interval and a preset data read rule that is determined based on the data storage time interval and the number of data reads.

Correspondingly, if reread error correction of the current data block under the first read voltage fails, it is also necessary to determine a second read voltage corresponding to the current data block according to the current data storage time interval and a preset data read rule that is determined based on the data storage time interval and the number of data reads. After data is stored in a solid state disk, if the solid state disk is powered down, the data storage time in the solid state disk will be updated to the time when the solid state disk is powered up again. Therefore, the data storage time of the current data block acquired in the solid state disk may not be the time when the data is initially stored in the current data block, and therefore there may be a case where reread error correction of the data in the current data block under the circumstance of the first read voltage failing.

Step S14: performing reread error correction on the data in the current data block based on the second read voltage until the reread error correction of the current data block meets a preset reread error correction condition.

After the second read voltage is determined, reread error correction may be performed on the data in the current data block based on the second read voltage until the reread error correction of the current data block meets a preset reread error correction condition. That is, reread error correction may be performed until the reread error correction of the current data block is successful, or until the reread error correction of the current data block is completed according to a read voltage corresponding to each data storage time interval in the preset data read rule and a read voltage corresponding to the number of data reads.

It can be seen that in the present application, in the case of a read error for data in a current data block, a first read voltage of the current data block is first determined according to a current data storage time interval to which a data storage time of the current data block belongs; then, reread error correction is performed on the data in the current data block based on the first read voltage; if reread error correction of the current data block fails, a second read voltage corresponding to the current data block is determined according to the current data storage time interval and a preset data read rule that is determined based on the data storage time interval and the number of data reads; and reread error correction is performed on the data in the current data block based on the second read voltage until the reread error correction of the current data block meets a preset reread error correction condition. In this way, in the case of a read error for data in a current data block, a first read voltage of the current data block is first determined according to a current data storage time interval to which a data storage time of the current data block belongs, and reread error correction is performed on the data in the current data block based on the first read voltage. If the reread error correction fails, a second read voltage corresponding to the current data block is determined according to the current data storage time interval and a preset data read rule, and reread error correction is performed on the data in the current data block based on the second read voltage until the reread error correction of the current data block meets a preset reread error correction condition. In this way, reread error correction is first performed on data from a data storage time dimension, and then reread error correction is performed on the data in the current data block according to the current data storage time interval to which the current data block belongs and the preset data read rule, whereby reread error correction can be performed on data having a read error in a solid state disk, the time of an ERF can be saved, and the efficiency of the ERF can be improved, thus improving the data read performance of the solid state disk.

Figure 2:
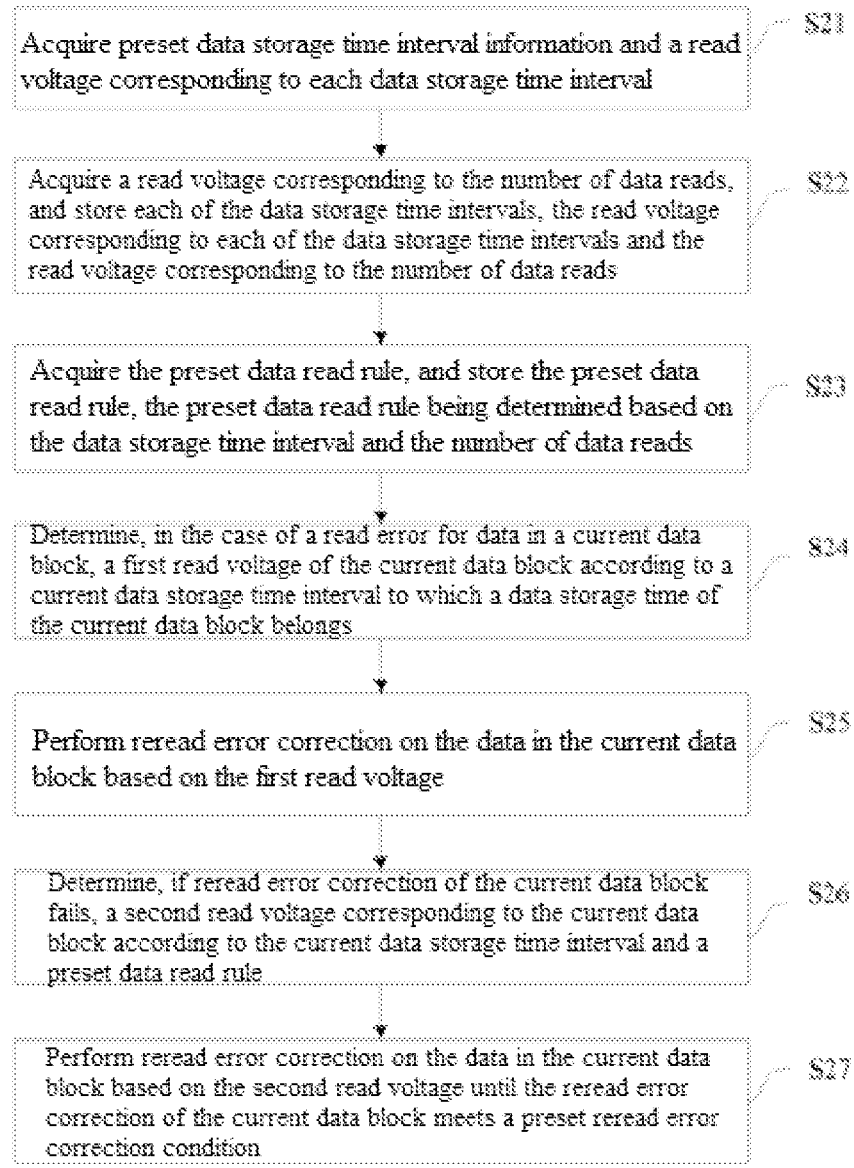
FIG. 2 is a flowchart of a solid state disk access method disclosed by the present application.

Referring to FIG. 2, an embodiment of the present application discloses a solid state disk access method, including the following steps:

Step S21: acquiring preset data storage time interval information and a read voltage corresponding to each data storage time interval.

In practical applications, it is necessary to acquire preset data storage time interval information and a read voltage corresponding to each data storage time interval. The data storage time is first divided into different intervals, and then a read voltage corresponding to each time interval is determined. For example, the data storage time is divided into three intervals: first interval A of 0-1 month, second interval B of 1-2 months, and third interval C of 2-3 months. The above-mentioned time intervals are all based on an equivalent time under 40 degrees Celsius. The division of each time interval may be determined according to a certain situation and is not limited herein.

The acquiring preset data storage time interval information and a read voltage corresponding to each data storage time interval includes: acquiring the preset data storage time interval information; and determining a read voltage corresponding to each data storage time interval in the preset data storage time interval information based on a read voltage in a retry table of a solid state disk where the current data block is located. That is, the preset data storage time interval information is first acquired, and then a read voltage corresponding to each data storage time interval in the preset data storage time interval information is determined based on a read voltage in a retry table of a solid state disk where the current data block is located. That is, data having a storage time belonging to each data storage time interval is read by simulation so as to determine a read voltage corresponding to each data storage time interval.

The step of determining a read voltage corresponding to any data storage time interval in the preset data storage time interval information based on a read voltage in a retry table of a solid state disk where the current data block is located includes: reading data having a storage time belonging to the data storage time interval based on each read voltage in the retry table respectively, so as to obtain a read accuracy rate corresponding to each read voltage in the retry table; and determining a read voltage corresponding to the data storage time interval according to the read accuracy rate. That is, data having a storage time belonging to the data storage time interval is read based on each read voltage in the retry table respectively, so as to obtain a read accuracy rate corresponding to each read voltage in the retry table. Then, the read accuracy rates are sorted in descending order, and the read voltages corresponding to the first N read accuracy rates are determined as the read voltage corresponding to the data storage time interval. N is a positive integer greater than or equal to 1. For example, N may be 8.

Step S22: acquiring a read voltage corresponding to the number of data reads, and storing each of the data storage time intervals, the read voltage corresponding to each of the data storage time intervals and the read voltage corresponding to the number of data reads.

It is also necessary to acquire a read voltage corresponding to the number of data reads, and store each of the data storage time intervals, the read voltage corresponding to each of the data storage time intervals and the read voltage corresponding to the number of data reads. The method of acquiring the read voltage corresponding to the number of data reads includes: reading data having different numbers of data reads based on each read voltage in the retry table respectively, so as to obtain a read accuracy rate corresponding to each read voltage in the retry table; and then, sorting the read accuracy rates in descending order, and determining the read voltages corresponding to the first M read accuracy rates as the read voltage corresponding to the number of data reads. M is a positive integer greater than or equal to 1. M and N may or may not be the same.

Step S23: acquiring the preset data read rule, and storing the preset data read rule, the preset data read rule being determined based on the data storage time interval and the number of data reads.

In practical applications, it is also necessary to acquire the preset data read rule, and store the preset data read rule. The preset data read rule determines that the reread error correction of the number-of-data-reads dimension cannot be performed in the last group.

For example, the data storage time interval is divided into the above-mentioned three intervals A, B and C, and the number of data reads is taken as group D. If the current data storage time interval to which the data storage time of the current data block belongs is A, after the reread error correction of the current data fails based on the read voltage corresponding to interval A, it is indicated that the actual data storage time of the current data block is greater than that in interval A, and therefore the read voltage corresponding to interval B is determined as the second read voltage. After the reread error correction of the current data fails based on the read voltage corresponding to interval B, it is indicated that the actual data storage time of the current data block is greater than that in interval B. The read voltage corresponding to interval C should be determined as the read voltage for the subsequent reread error correction. However, if the read voltage corresponding to interval C is determined as the read voltage for the subsequent reread error correction, the read voltages of group D will become the read voltages of the last group. In this way, the number of reads for the reread error correction is greater than that when the data storage time is not divided into intervals. Therefore, after the reread error correction of the current data fails based on the read voltage corresponding to interval B, the read voltage corresponding to group D needs to be determined as the read voltage for the next reread error correction, and after the reread error correction of the current data fails under the read voltage corresponding to group D, the read voltage corresponding to interval C is determined as the read voltage for the next reread error correction. That is, the groups to which the read voltages for the reread error correction belong are in an order A-B-D-C.

Similarly, if the current data storage time interval to which the data storage time of the current data block belongs is B, after the reread error correction of the current data fails based on the read voltage corresponding to interval B, the read voltage corresponding to interval C is determined as the second read voltage. After the reread error correction of the current data fails based on the read voltage corresponding to interval C, the read voltage of group D is determined as the read voltage for the next reread error correction. After the reread error correction of the current data fails at group D, since the data storage time of interval C is the longest but the reread error correction still fails, the read voltage of interval A may be used for trying to perform reread error correction on the current data block. That is, the groups to which the read voltages for the reread error correction belong are in an order B-C-D-A.

If the current data storage time interval to which the data storage time of the current data block belongs is C, after the reread error correction of the current data fails based on the read voltage corresponding to interval C, the read voltage corresponding to interval D is determined as the second read voltage. After the reread error correction of the current data fails based on the read voltage corresponding to interval D, since the data storage time of interval C is the longest but the reread error correction still fails, the read voltage of interval A may be used for trying to perform reread error correction on the current data block. After the reread error correction of the current data fails under the read voltage corresponding to interval A, the read voltage of interval B may be used for trying to perform reread error correction on the current data block. That is, the groups to which the read voltages for the reread error correction belong are in an order C-D-A-B.

Step S24: determining, in the case of a read error for data in a current data block, a first read voltage of the current data block according to a current data storage time interval to which a data storage time of the current data block belongs.

In the case of a read error for data in a current data block, a first read voltage of the current data block is determined according to a current data storage time interval to which a data storage time of the current data block belongs.

Step S25: performing reread error correction on the data in the current data block based on the first read voltage.

Step S26: determining, if reread error correction of the current data block fails, a second read voltage corresponding to the current data block according to the current data storage time interval and a preset data read rule.

After reread error correction is performed on the data in the current data block based on the first read voltage, if reread error correction of the current data block fails, a second read voltage corresponding to the current data block according to the current data storage time interval and a preset data read rule. For example, if the current data storage time interval is the above-mentioned interval A, the read voltage corresponding to interval B is determined as the second read voltage.

Step S27: performing reread error correction on the data in the current data block based on the second read voltage until the reread error correction of the current data block meets a preset reread error correction condition.

It will be appreciated that after the first read voltage is determined, reread error correction may be performed on the data in the current data block based on the second read voltage until the reread error correction of the current data block meets a preset reread error correction condition.

Figure 3:
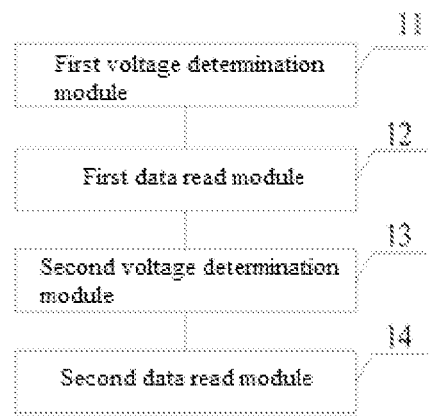
FIG. 3 is a schematic structural diagram of a solid state disk access apparatus disclosed by the present application.

Referring to FIG. 3, an embodiment of the present application discloses a solid state disk access apparatus, including:

a first voltage determination module 11, configured to determine, in the case of a read error for data in a current data block, a first read voltage of the current data block according to a current data storage time interval to which a data storage time of the current data block belongs;

a first data read module 12, configured to perform reread error correction on the data in the current data block based on the first read voltage;

a second voltage determination module 13, configured to determine, when reread error correction of the current data block fails, a second read voltage corresponding to the current data block according to the current data storage time interval and a preset data read rule that is determined based on the data storage time interval and the number of data reads; and a second data read module 14, configured to perform reread error correction on the data in the current data block based on the second read voltage until the reread error correction of the current data block meets a preset reread error correction condition.

It can be seen that in the present application, in the case of a read error for data in a current data block, a first read voltage of the current data block is first determined according to a current data storage time interval to which a data storage time of the current data block belongs; then, reread error correction is performed on the data in the current data block based on the first read voltage; if reread error correction of the current data block fails, a second read voltage corresponding to the current data block is determined according to the current data storage time interval and a preset data read rule that is determined based on the data storage time interval and the number of data reads; and reread error correction is performed on the data in the current data block based on the second read voltage until the reread error correction of the current data block meets a preset reread error correction condition. In this way, in the case of a read error for data in a current data block, a first read voltage of the current data block is first determined according to a current data storage time interval to which a data storage time of the current data block belongs, and reread error correction is performed on the data in the current data block based on the first read voltage. If the reread error correction fails, a second read voltage corresponding to the current data block is determined according to the current data storage time interval and a preset data read rule, and reread error correction is performed on the data in the current data block based on the second read voltage until the reread error correction of the current data block meets a preset reread error correction condition. In this way, reread error correction is first performed on data from a data storage time dimension, and then reread error correction is performed on the data in the current data block according to the current data storage time interval to which the current data block belongs and the preset data read rule, whereby reread error correction can be performed on data having a read error in a solid state disk, the time of an ERF can be saved, and the efficiency of the ERF can be improved, thus improving the data read performance of the solid state disk.

The first data read module 12 is configured to perform, when the first read voltage includes a plurality of read voltage values, reread error correction on the data in the current data block based on each read voltage value in the first read voltage respectively.

The solid state disk access apparatus further includes:

a first data acquisition module, configured to acquire preset data storage time interval information and a read voltage corresponding to each data storage time interval;

a second data acquisition module, configured to acquire a read voltage corresponding to the number of data reads; and a data storage module, configured to store each of the data storage time intervals, the read voltage corresponding to each of the data storage time intervals and the read voltage corresponding to the number of data reads.

The first data acquisition module is configured for:

acquiring the preset data storage time interval information; and determining a read voltage corresponding to each data storage time interval in the preset data storage time interval information based on a read voltage in a retry table of a solid state disk where the current data block is located.

The first data acquisition module is further configured for:

reading data having a storage time belonging to the data storage time interval based on each read voltage in the retry table respectively, so as to obtain a read accuracy rate corresponding to each read voltage in the retry table; and determining a read voltage corresponding to the data storage time interval according to the read accuracy rate.

The solid state disk access apparatus further includes:

a third data acquisition module, configured to acquire the preset data read rule, and store the preset data read rule.

The solid state disk access apparatus further includes:

a first judgment module, configured to judge whether the read accuracy rate of the current data block is greater than or equal to a preset accuracy rate threshold value;

a second judgment module, configured to determine that the reread error correction of the current data block is successful if the read accuracy rate of the current data block is greater than or equal to the preset accuracy rate threshold value; and a third judgment module, configured to determine that the reread error correction of the current data block fails if the read accuracy rate of the current data block is smaller than the preset accuracy rate threshold value.

Figure 4:
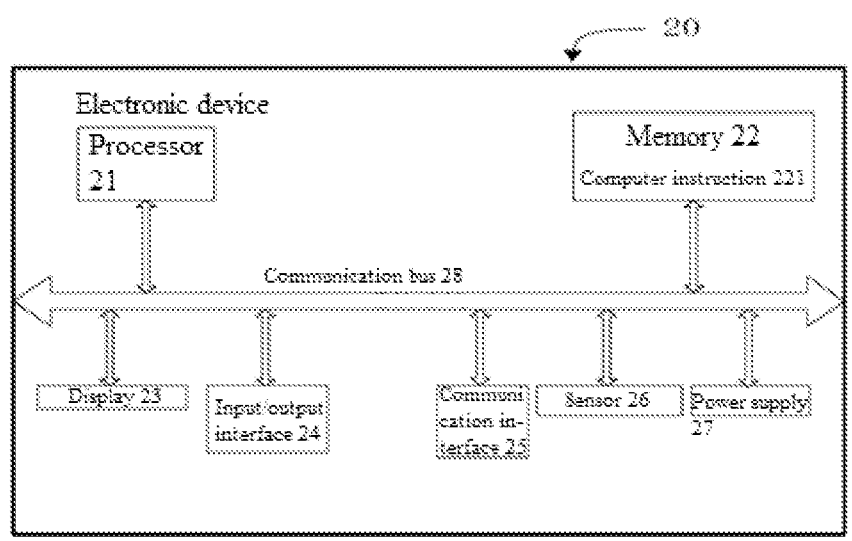
FIG. 4 is a structural diagram of an electronic device disclosed by the present application.

FIG. 4 is a schematic structural diagram of an electronic device 20 provided in an embodiment of the present application. The electronic device 20 may include, but is not limited to, a tablet computer, a notebook computer, or a desktop computer.

Generally, the electronic device 20 in this embodiment includes: a processor 21 and a memory 22.

The processor 21 may include one or more processing cores, such as a four-core processor or an eight-core processor. The processor 21 may be implemented using at least one hardware of a digital signal processor (DSP), a field-programmable gate array (FPGA), or a programmable logic array (PLA). The processor 21 may also include a main processor and a co-processor. The main processor is a processor for processing data in a wake-up state, also called a central processing unit (CPU). The co-processor is a low-power processor for processing data in a standby state. In some embodiments, the processor 21 may be integrated with a graphics processing unit (GPU) responsible for the rendering and drawing of an image to be displayed on a display. In some embodiments, the processor 21 may include an artificial intelligence (AI) processor for processing computing operations related to machine learning.

The memory 22 may include one or more computer-readable storage media, which may be non-transitory. The memory 22 may also include a high speed random access memory, as well as a non-volatile memory, such as one or more magnetic disk storage devices or flash memory storage devices. In this embodiment, the memory 22 is at least configured to store a computer instruction 221 which, after being loaded and executed by the processor 21, is capable of implementing the steps of the solid state disk access method disclosed in any of the foregoing embodiments.

In some embodiments, the electronic device 20 may also include a display 23, an input/output interface 24, a communication interface 25, a sensor 26, a power supply 27, and a communication bus 28.

It will be appreciated by those skilled in the art that the structure illustrated in FIG. 4 is not limiting of the electronic device 20 and may include more or fewer components than those illustrated.

Further, an embodiment of the present application also discloses a computer-readable storage medium for storing a computer instruction. The computer instruction, when executed by a processor, implements the solid state disk access method disclosed in any of the foregoing embodiments.

The process regarding the above-mentioned solid state disk access method may be referred to the corresponding contents disclosed in the foregoing embodiments, and will not be described in detail herein.

Various embodiments are described herein in a progressive manner. Each embodiment focuses on differences from the other embodiments. The same or similar parts of the various embodiments may be referred to each other. As to the apparatus disclosed in the embodiment, since the apparatus corresponds to the method disclosed in the embodiment, the description is relatively simple. The relevant part may be described with reference to the method section.

The steps of the method or algorithm described in connection with the embodiments disclosed herein may be implemented directly in hardware, in a software module executed by a processor, or in a combination thereof. The software module may be provided in a random access memory (RAM), a memory, a read-only memory (ROM), an electrically programmable ROM, an electrically erasable programmable ROM, a register, a hard disk, a removable disk, a CD-ROM, or any other form of storage medium known in the art.

Finally, it should also be noted that relational terms such as first and second herein are used solely to distinguish one entity or operation from another entity or operation without necessarily requiring or implying any actual such relationship or order between such entities or operations. Moreover, the terms "include", "contain", or any other variations thereof are intended to cover a non-exclusive inclusion, such that a process, method, article, or device including a series of other elements not only includes those elements, but also includes other elements that are not explicitly listed, or also includes elements inherent to such process, method, article, or device. It is not excluded, without more constraints, that additional identical elements exist in the process, method, article, or device including elements defined by a sentence "including a . . . ".

The solid state disk access method and apparatus, the device and the medium provided by the present application have been introduced in detail above. The principle and implementation of the present application have been set forth herein using certain examples, which have been set forth only to aid in the understanding of the methods and core ideas of the present application. Meanwhile, those ordinarily skilled in the art will appreciate that many changes can be made in the detailed description and the application scope in light of the ideas of the present application. In summary, the contents herein should not be construed as limiting the present application.

What is claimed is:

1. A solid state disk access method, comprising:

determining, in response to a read error for data in a current data block, a first read voltage of the current data block according to a current data storage time interval to which a data storage time of the current data block belongs;

performing reread error correction on the data in the current data block based on the first read voltage;

determining, in response to reread error correction of the current data block failing, a second read voltage corresponding to the current data block according to the current data storage time interval and a preset data read rule that is determined based on the data storage time interval and a number of data reads;

performing reread error correction on the data in the current data block based on the second read voltage until the reread error correction of the current data block meets a preset reread error correction condition;

wherein the step of performing reread error correction on the data in the current data block based on the first read voltage comprises:

performing, in response to the first read voltage comprising a plurality of read voltage values, reread error correction on the data in the current data block based on each read voltage value in the first read voltage respectively.

2. The solid state disk access method according to claim 1, wherein before the step of determining, in response to the read error for data in the current data block, the first read voltage of the current data block according to the current data storage time interval to which the data storage time of the current data block belongs, the method further comprises:

acquiring preset data storage time interval information and a read voltage corresponding to each data storage time interval; and acquiring a read voltage corresponding to the number of data reads, and storing each of the data storage time intervals, the read voltage corresponding to each of the data storage time intervals and the read voltage corresponding to the number of data reads.

3. The solid state disk access method according to claim 2, wherein the step of acquiring the preset data storage time interval information and the read voltage corresponding to each of the data storage time intervals comprises:

acquiring the preset data storage time interval information; and determining the read voltage corresponding to each of the data storage time intervals in the preset data storage time interval information based on a read voltage in a retry table of a solid state disk where the current data block is located.

4. The solid state disk access method according to claim 3, wherein the step of determining the read voltage corresponding to any data storage time interval in the preset data storage time interval information based on the read voltage in the retry table of the solid state disk where the current data block is located comprises:

reading data having a storage time belonging to the data storage time interval based on each of the read voltage in the retry table respectively, so as to obtain a read accuracy rate corresponding to each of the read voltage in the retry table; and determining a read voltage corresponding to the data storage time interval according to the read accuracy rate.

5. The solid state disk access method according to claim 3, further comprising:

reading data having a storage time belonging to each data storage time interval by simulation, so as to determine the read voltage corresponding to the each of the data storage time intervals.

6. The solid state disk access method according to claim 1, wherein before the step of determining, in response to the read error for data in the current data block, the first read voltage of the current data block according to the current data storage time interval to which the data storage time of the current data block belongs, the method further comprises:

acquiring the preset data read rule, and storing the preset data read rule.

7. The solid state disk access method according to claim 1, wherein after the step of performing reread error correction on the data in the current data block based on the first read voltage, the method further comprises:

judging whether a read accuracy rate of the current data block is greater than or equal to a preset accuracy rate threshold value;

determining that the reread error correction of the current data block is successful in response to the read accuracy rate of the current data block being greater than or equal to the preset accuracy rate threshold value; and determining that the reread error correction of the current data block fails in response to the read accuracy rate of the current data block being smaller than the preset accuracy rate threshold value.

8. An electronic device, comprising:

a memory and a processor, wherein the memory is configured to store a computer instruction; and the processor is configured to execute the computer instruction so as to implement the steps of:

determining, in response to a read error for data in a current data block, a first read voltage of the current data block according to a current data storage time interval to which a data storage time of the current data block belongs;

performing reread error correction on the data in the current data block based on the first read voltage;

determining, in response to reread error correction of the current data block failing, a second read voltage corresponding to the current data block according to the current data storage time interval and a preset data read rule that is determined based on the data storage time interval and a number of data reads;

performing reread error correction on the data in the current data block based on the second read voltage until the reread error correction of the current data block meets a preset reread error correction condition;

wherein the step of performing reread error correction on the data in the current data block based on the first read voltage comprises:

performing, in response to the first read voltage comprising a plurality of read voltage values, reread error correction on the data in the current data block based on each read voltage value in the first read voltage respectively.

9. The electronic device according to claim 8, wherein the processor, upon execution of the computer instruction, is further configured to:

acquire preset data storage time interval information and a read voltage corresponding to each data storage time interval; and acquire a read voltage corresponding to the number of data reads, and store each of the data storage time intervals, the read voltage corresponding to each of the data storage time intervals and the read voltage corresponding to the number of data reads.

10. The electronic device according to claim 9, wherein the processor, upon execution of the computer instruction, is further configured to:

acquire the preset data storage time interval information; and determine the read voltage corresponding to each of the data storage time intervals in the preset data storage time interval information based on a read voltage in a retry table of a solid state disk where the current data block is located.

11. The electronic device according to claim 10, wherein the processor, upon execution of the computer instruction, is further configured to:
- read data having a storage time belonging to the data storage time interval based on each of the read voltage in the retry table respectively, so as to obtain a read accuracy rate corresponding to each of the read voltage in the retry table; and
- determine a read voltage corresponding to the data storage time interval according to the read accuracy rate.

12. The electronic device according to claim 10, wherein the processor, upon execution of the computer instruction, is further configured to:
- read data having a storage time belonging to each data storage time interval by simulation, so as to determine the read voltage corresponding to the each of the data storage time intervals.

13. The electronic device according to claim 8, wherein the processor, upon execution of the computer instruction, is further configured to:
- acquire the preset data read rule, and store the preset data read rule.

14. The electronic device according to claim 8, wherein the processor, upon execution of the computer instruction, is further configured to:
- judge whether a read accuracy rate of the current data block is greater than or equal to a preset accuracy rate threshold value;
- determine that the reread error correction of the current data block is successful in response to the read accuracy rate of the current data block being greater than or equal to the preset accuracy rate threshold value; and
- determine that the reread error correction of the current data block fails in response to the read accuracy rate of the current data block being smaller than the preset accuracy rate threshold value.

15. A computer-readable storage medium, configured to store a computer instruction, wherein the computer instruction, upon execution by a processor, implements the steps of:
- determining, in response to a read error for data in a current data block, a first read voltage of the current data block according to a current data storage time interval to which a data storage time of the current data block belongs;
- performing reread error correction on the data in the current data block based on the first read voltage;
- determining, in response to reread error correction of the current data block failing, a second read voltage corresponding to the current data block according to the current data storage time interval and a preset data read rule that is determined based on the data storage time interval and a number of data reads;
- performing reread error correction on the data in the current data block based on the second read voltage until the reread error correction of the current data block meets a preset reread error correction condition;
- wherein the step of performing reread error correction on the data in the current data block based on the first read voltage comprises:
  - performing, in response to the first read voltage comprising a plurality of read voltage values, reread error correction on the data in the current data block based on each read voltage value in the first read voltage respectively.

16. The computer-readable storage medium according to claim 15, wherein the computer instruction, upon execution by the processor, is further configured to cause the processor to:
- acquire preset data storage time interval information and a read voltage corresponding to each data storage time interval; and
- acquire a read voltage corresponding to the number of data reads, and store each of the data storage time intervals, the read voltage corresponding to each of the data storage time intervals and the read voltage corresponding to the number of data reads.

17. The computer-readable storage medium according to claim 16, wherein the computer instruction, upon execution by the processor, is further configured to cause the processor to:
- acquire the preset data storage time interval information; and
- determine the read voltage corresponding to each of the data storage time intervals in the preset data storage time interval information based on a read voltage in a retry table of a solid state disk where the current data block is located.

18. The computer-readable storage medium according to claim 17, wherein the computer instruction, upon execution by the processor, is further configured to cause the processor to:
- read data having a storage time belonging to the data storage time interval based on each of the read voltage in the retry table respectively, so as to obtain a read accuracy rate corresponding to each of the read voltage in the retry table; and
- determine a read voltage corresponding to the data storage time interval according to the read accuracy rate.

19. The computer-readable storage medium according to claim 15, wherein the computer instruction, upon execution by the processor, is further configured to cause the processor to:
- acquire the preset data read rule, and store the preset data read rule.

20. The computer-readable storage medium according to claim 15, wherein the computer instruction, upon execution by the processor, is further configured to cause the processor to:
- judge whether a read accuracy rate of the current data block is greater than or equal to a preset accuracy rate threshold value;
- determine that the reread error correction of the current data block is successful in response to the read accuracy rate of the current data block being greater than or equal to the preset accuracy rate threshold value; and
- determine that the reread error correction of the current data block fails in response to the read accuracy rate of the current data block being smaller than the preset accuracy rate threshold value.

* * * * *